(12) United States Patent
Liu

(10) Patent No.: US 8,254,110 B2
(45) Date of Patent: Aug. 28, 2012

(54) FIXING MECHANISM AND ELECTRONIC DEVICE HAVING THE SAME

(75) Inventor: Zhi-Hua Liu, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 226 days.

(21) Appl. No.: 12/868,917

(22) Filed: Aug. 26, 2010

(65) Prior Publication Data
US 2011/0128681 A1     Jun. 2, 2011

(30) Foreign Application Priority Data

Nov. 30, 2009   (CN) .......................... 2009 1 0310671

(51) Int. Cl.
*G06F 1/16*   (2006.01)
(52) U.S. Cl. ............... 361/679.39; 361/679.02
(58) Field of Classification Search ............ 361/679.02, 361/679.39, 679.31, 679.58; 74/25
See application file for complete search history.

(56) References Cited

U.S. PATENT DOCUMENTS

| | | | | |
|---|---|---|---|---|
| 4,986,618 A | * | 1/1991 | Wakatsuki | 312/276 |
| 8,094,439 B2 | * | 1/2012 | Lin | 361/679.01 |
| 8,189,327 B2 | * | 5/2012 | Chang | 361/679.31 |
| 2006/0245160 A1 | * | 11/2006 | Zhang et al. | 361/685 |
| 2009/0213540 A1 | * | 8/2009 | Zhang et al. | 361/679.58 |

* cited by examiner

*Primary Examiner* — Lisa Lea Edmonds
(74) *Attorney, Agent, or Firm* — Altis Law Group, Inc.

(57) ABSTRACT

A fixing mechanism mounts a peripheral component to an electronic device. The fixing mechanism includes a housing, a contact member, a sliding member, a first resilient member and a link bar assembly. The housing defines a holding portion to receive the peripheral component, positioning portions and a guiding portion located on sidewalls of the holding portion. The contact member is moveably disposed in the housing adjacent to the holding portion. The sliding member resists the contact member. The first resilient member resists between the contact member and the housing. The peripheral component includes a first engaging portion and a second engaging portion. The first engaging portion is received in the positioning portion. The latching portion slides along the guiding portion until the latching portion latches the second engaging portion.

20 Claims, 4 Drawing Sheets

FIXING MECHANISM AND ELECTRONIC DEVICE HAVING THE SAME

BACKGROUND

1. Technical Field

The present disclosure relates to fixing mechanisms, and particularly, to a fixing mechanism capable of detachably fixing a peripheral component to an electronic device.

2. Description of the Related Art

Electronic devices, such as notebooks or mobile phones, include a fixing mechanism detachably attaching a peripheral component to the electronic device. The peripheral component can be, for example, a battery of a notebook computer, a cover of a hard disk or other.

A fixing mechanism for a peripheral component of an electronic device includes a housing, a contact member, a sliding member, and a resilient member. The housing defines a holding portion to receive the peripheral component. The contact member is moveably disposed in the housing, and is adjacent to the holding portion. The resilient member sleeves on the contact member and resists the housing. The sliding member includes a first end and a second end opposite to the first end. The first end resists the contact member. The second end resists the peripheral component. The housing further defines a positioning groove on a sidewall of the holding portion. The peripheral component includes a positioning protrusion received in the positioning groove. When the contact member biases the first end of the sliding member, the second end of the sliding member biases the peripheral component, such that the positioning protrusion then withdraws from the positioning groove, and pushes out the peripheral component from the holding portion. However, upon impact, the peripheral component is prone to detachment from the holding portion, rendering operation undependable.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
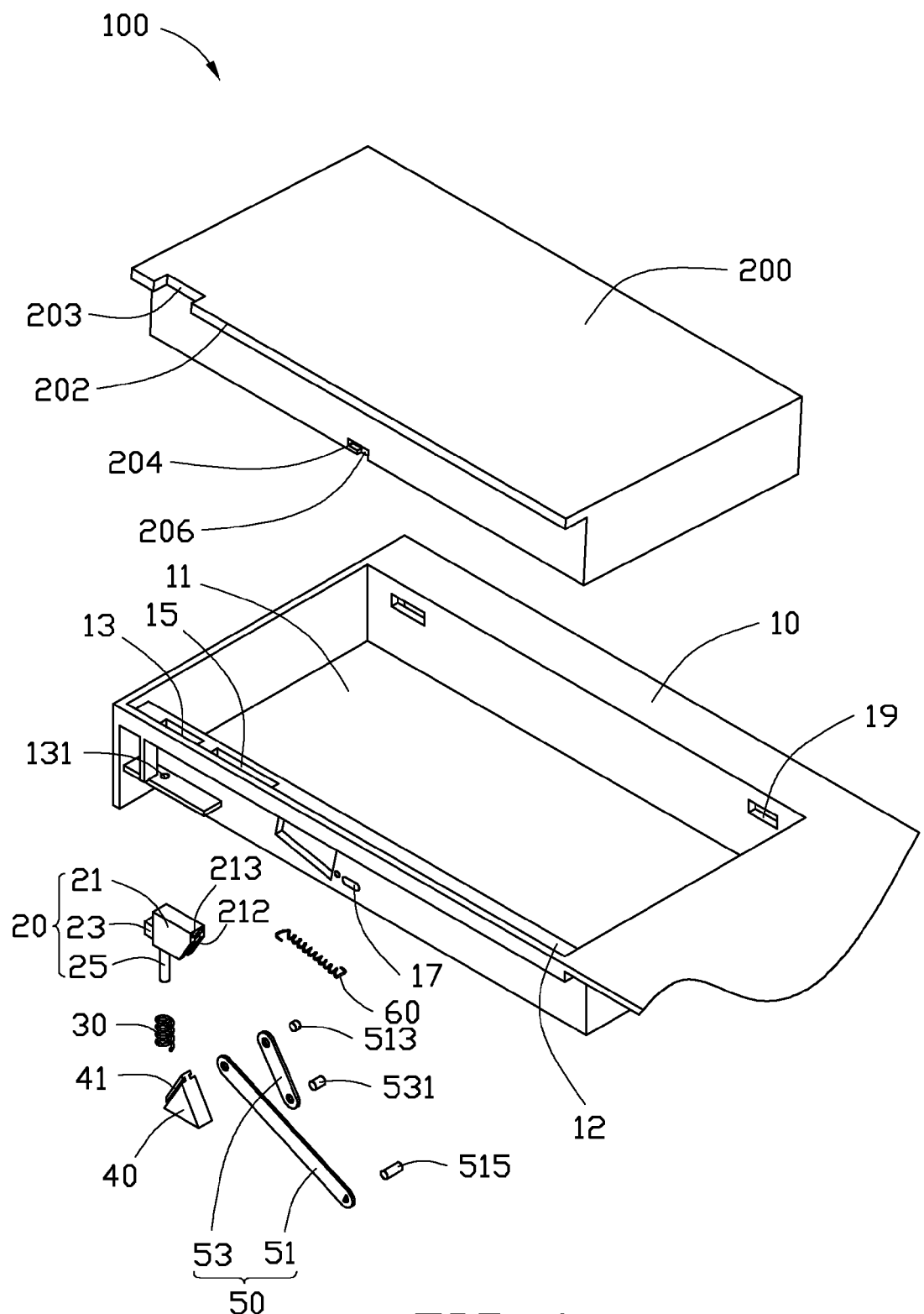
FIG. 1 is an exploded, isometric view of one embodiment of a fixing mechanism.
Figure 2:
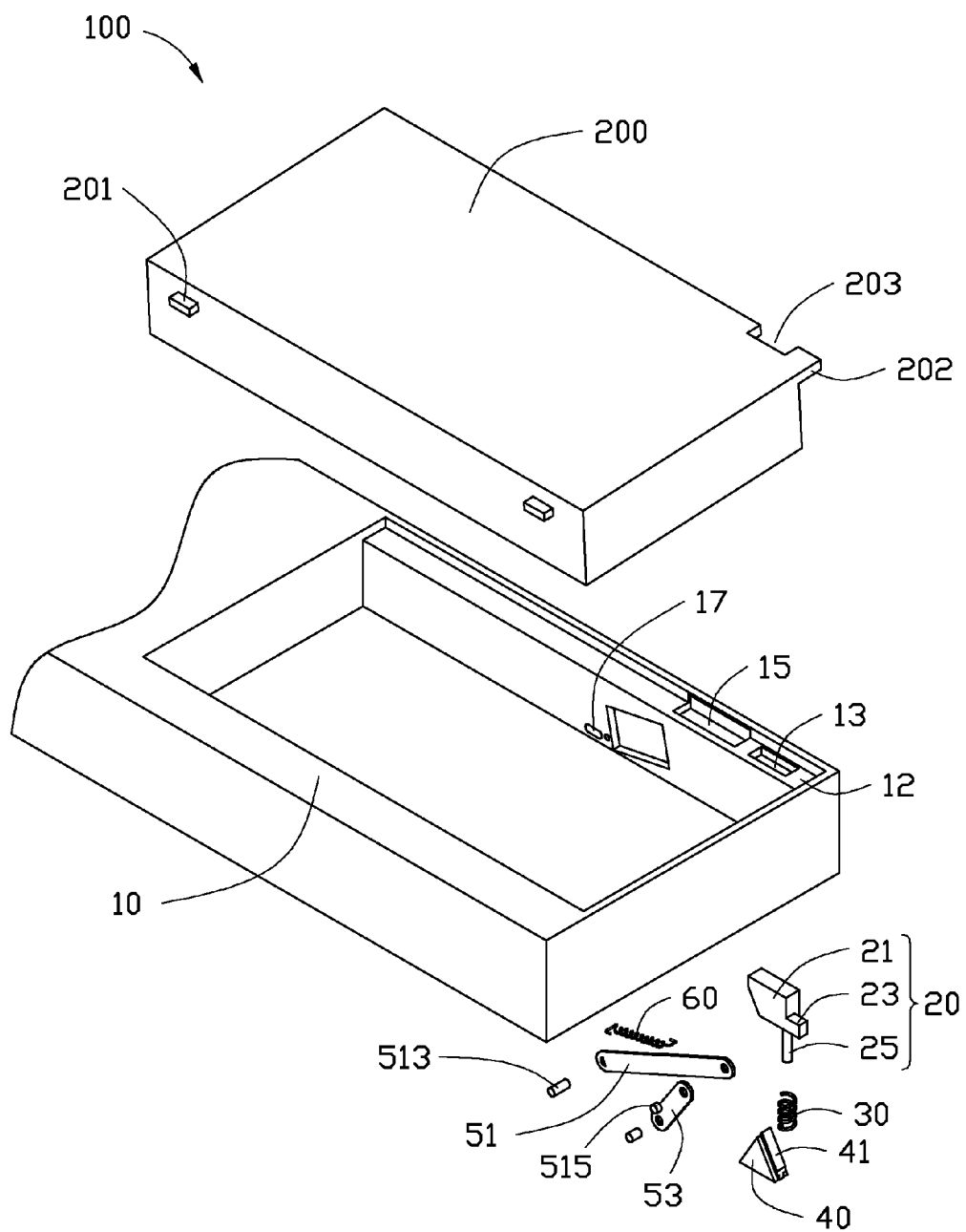
FIG. 2 is similar to FIG. 1, but viewed from another aspect.

Referring to FIGS. 1 and 2, one embodiment of an electronic device (not labeled) includes a fixing mechanism 100 and a peripheral component 200. The fixing mechanism 100 includes a housing 10, a contact member 20, a first resilient member 30, a sliding member 40, a link bar assembly 50 and a second resilient member 60. The fixing mechanism 100 is used to fix the peripheral component 200 to the housing 10. The first resilient member 30 sleeves on the contact member 20. The contact member 20 and the first resilient member 30 are moveably disposed in the housing 10. The link bar assembly 50 is rotatably connected to the housing 10. The sliding member 40 is slidably fixed in the housing 10, and resists the contact member 20 and the link bar assembly 50. The second resilient member 60 fixedly interconnects the link bar assembly 50 and the housing 10. The peripheral component 200 can be a battery of a notebook computer, a cover of a hard disk, or other. In the illustrated embodiment, the peripheral component 200 is a battery of a notebook computer.

The housing 10 includes a holding portion 11, a step portion 12, a first receiving groove 13, a second receiving groove 15, a guiding portion 17 and two positioning portions 19. The holding portion 11 is defined on a top surface of the housing 10. The peripheral component 200 is received in the holding portion 11. The step portion 12 is defined at adjacent to the holding portion 11 in the housing 10. The first receiving groove 13 and the second receiving groove 15 are defined on the step portion 12. The first receiving groove 13 communicates with the second receiving groove 15 at an outer side of the holding portion 11. The contact member 20, the first resilient member 30, the sliding member 40 are received in the first receiving groove 13. The housing 10 further defines a through hole 131 on a bottom surface of the first receiving groove 13. The link bar assembly 50 is partially received in the second receiving groove 15. The guiding portion 17 is defined in an outer surface of the sidewall of the holding portion 11 adjacent to the step portion 12. The two positioning portions 19 are defined on an inner surface of a sidewall of the holding portion 11 facing the guiding portion 17. In the illustrated embodiment, the guiding portion 17 is a substantially oblong hole running through the outer surface of the sidewall of the holding portion 11. Each positioning portion 19 is a positioning groove defined on the sidewall of the holding portion 11.

The contact member 20 includes a biasing portion 21, a resisting protrusion 23, and a support protrusion 25. The biasing portion 21 has a shape of a rectangular block which is missing a corner. The resisting protrusion 23 is located on a side of the biasing portion 21. The support protrusion 25 is located on a side of the biasing portion 21 adjacent to the resisting protrusion 23. The biasing portion 21 defines an angled surface 212 on a side of the biasing portion 21 away from the resisting protrusion 23. The biasing portion 21 further defines a dovetail groove 213 on the angled surface 212. The resisting protrusion 23 is capable of preventing detachment of the contact member 20 from the first receiving groove 13. The support protrusion 25 passes through the through hole 131 of the housing 10.

The first resilient member 30 is a substantially cylindrical compression spring, and sleeves on the support protrusion 25 of the contact member 20.

The sliding member 40 is substantially triangular, and includes a sliding protrusion 41 having a substantially dovetail shape located on a side surface of the sliding member 40. The sliding protrusion 41 can slide in the dovetail groove 213 of the contact member 20.

The link bar assembly 50 includes a long connecting bar 51 and a short connecting bar 53. The long connecting bar 51 includes two shafts 513, 515 located on opposite ends of the long connecting bar 51. The long connecting bar 51 is rotatably connected to the housing 10 and the short connecting bar 53 via the two shafts 513, 515, respectively. The short connecting bar 53 includes a latching portion 531 located on a free end of the short connecting bar 53. The latching portion 531 slides in the guiding portion 17 of the housing 10. In the illustrated embodiment, the latching portion 531 is a latching protrusion extending perpendicular to an end of the short connecting bar 53.

The second resilient member 60 is a substantially cylindrical tension spring. Opposite ends of the second resilient member 60 are fixed to a sidewall of the second receiving groove 15 of the housing 10 and a middle portion 51 of the long connecting bar 51.

The peripheral component 200 includes two first engaging portions 201, a boss 202, and a second engaging portion 204. The first engaging portions 201 are located on a side of the peripheral component 200. The boss 202 is located on a side of the peripheral component 200 opposite to the first engaging portions 201. The boss 202 defines a cutout 203 in an end of the boss 202. The biasing portion 21 of the contact member 20 is received in the cutout 203. The second engaging portion 204 is located on the side of the peripheral component 200 corresponding to a middle portion of the boss 202. The latching portion 531 of the link bar assembly 50 is received in the second engaging portion 204. In one embodiment, the first engaging portion 201 is a protrusion located on the side of the peripheral component 200. The second engaging portion 204 is a substantially oblong groove defined in the side of the peripheral component 200. The second engaging portion 204 has a cutout 206 defined on an end of the second engaging portion 204. The latching portion 531 of the link bar assembly 50 is slidably received in the second engaging portion 204 via the cutout 206.

To assemble the fixing mechanism 100, one end of long connecting bar 51 is rotatably connected to the short connecting bar 53 via the shaft 515. The latching portion 531 of the short connecting bar 53 is passed through the guiding portion 17 of the housing. The other end of the long connecting bar 51 is rotatably fixed on a sidewall of the receiving groove 15. Two ends of the second resilient member 60 are fixed to the housing 10 and a middle portion of the long connecting bar 51, respectively. The sliding member 40 is received in the first receiving groove 13 of the housing 10. Later, the first resilient member 30 is sleeved on the support protrusion 25 of the contact member 20. The contact member 20 is received in the first receiving groove 13. The support protrusion 25 of the contact member 20 passes through the through hole 131 of the housing 10. The sliding protrusion 41 of the sliding member 40 is received in the dovetail groove 213 of the contact member 20.

Figure 3:
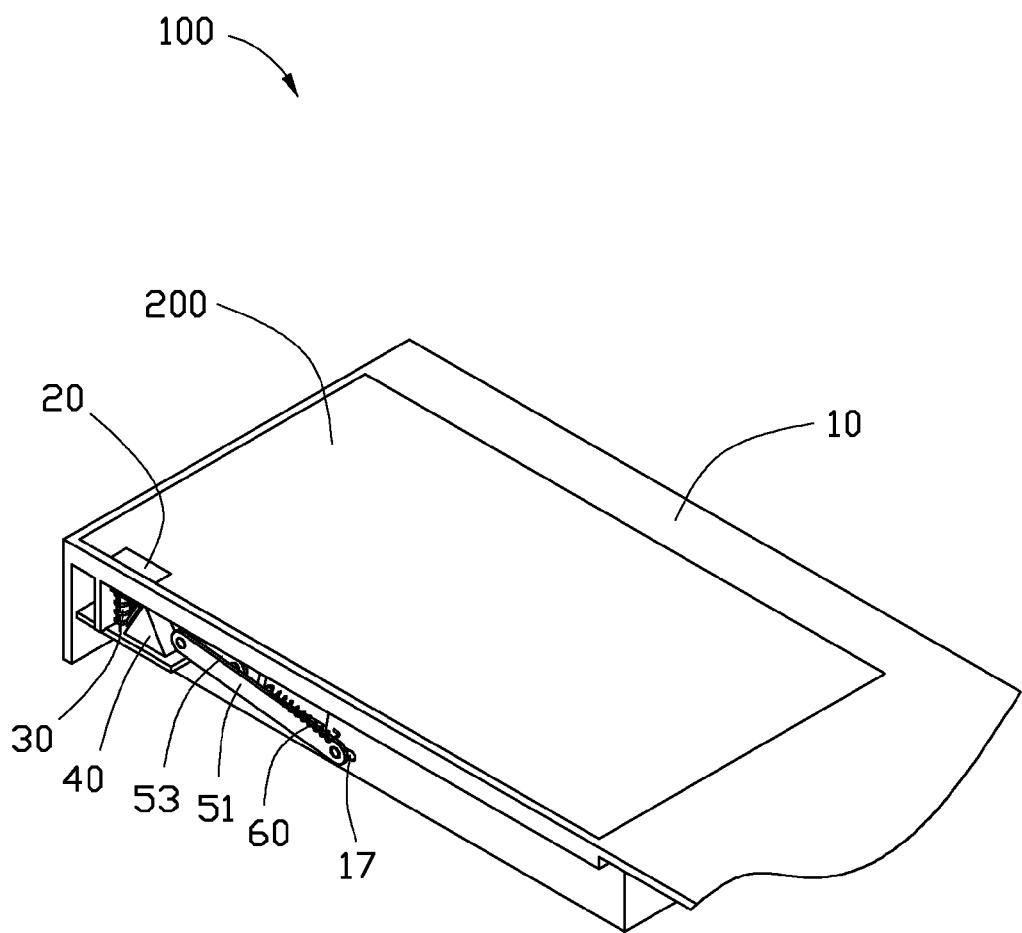
FIG. 3 is an isometric view of the fixing mechanism fixing a peripheral component to an electronic device shown in FIG. 1.
Figure 4:
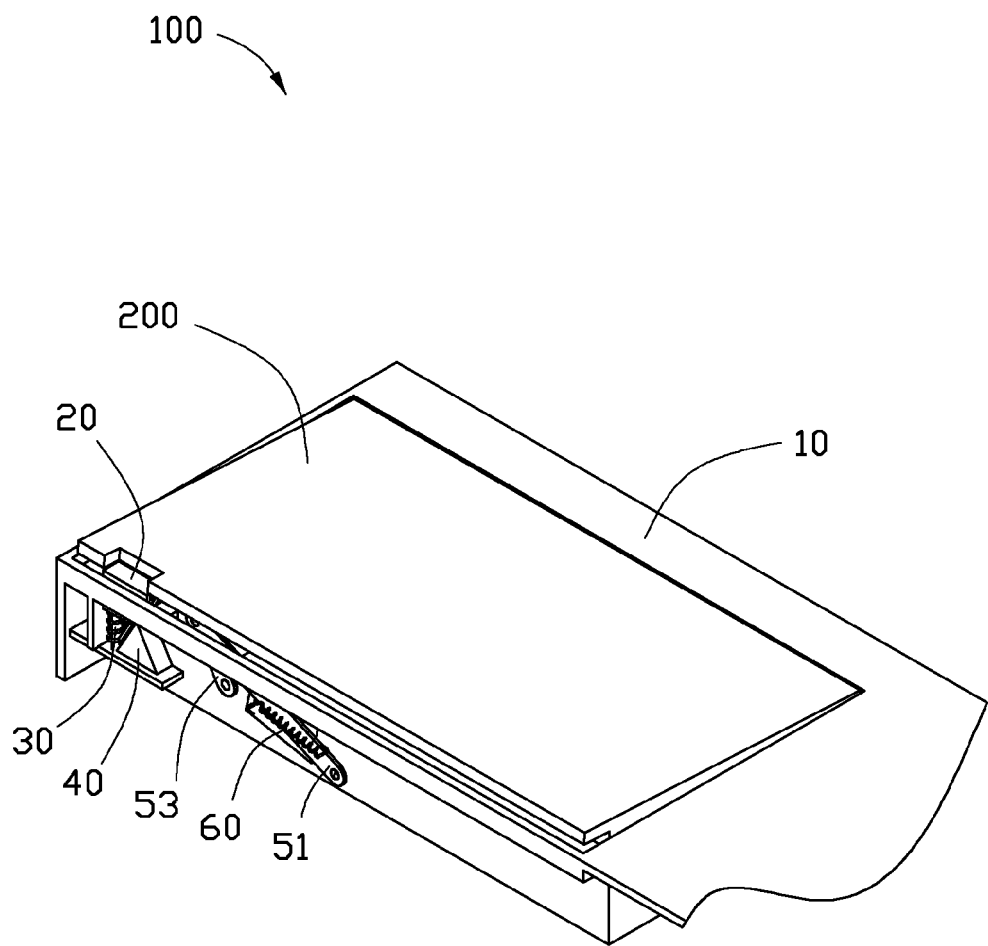
FIG. 4 is an isometric view of the fixing mechanism detached from the peripheral component shown in FIG. 1.

Referring to FIGS. 1 through 3, when the fixing mechanism 100 fixes the peripheral component 200 to the holding portion 11 of the housing 10, an end of the peripheral component 200 is received in the holding portion 11 initially, such that the second engaging portion 204 of the peripheral component 200 is received in the positioning portion 19 of the housing 10. The other end of the peripheral component 200 is received in the holding portion 11 of the housing 10, such that the latching portion 531 of the short connecting bar 53 is received in the cutout 206 of the second engaging portion 204. The peripheral component 200 resists an end of the long connecting bar 51 connecting to the short connecting bar 53, such that the long connecting bar 51 slides toward a bottom of the second receiving groove 15. The second resilient member 60 is pulled by the long connecting bar 51. The latching portion 531 slides toward the guiding portion 17 of the housing 10 until the latching portion 531 latches in the second engaging portion 204. Then, the second resilient member 60 resumes its original state. Finally, the peripheral component 200 is fixed in the holding portion 11 of the housing 10.

Referring to FIGS. 1 through 4, when the peripheral component 200 is withdrawn from the housing 10, the first resilient member 30 is compressed by the contact member 20, such that the sliding member 40 slides toward the link bar assembly 50. The sliding member 40 biases an end of the long connecting bar 51 connecting to the short connecting bar 53, such that the long connecting bar 51 rotates toward the opening of the second engaging groove 15. The latching portion 531 of the short connecting bar 53 slides in the guiding portion 17 of the housing 10. When the latching portion 531 of the short connecting bar 53 slides to the cutout 206 of the second engaging portion 204, an end of the long connecting bar 51 connecting to the short connecting bar 53 pushes out of the second engaging groove 15 of the housing, and biases the peripheral component 200 to push it out, such that the first engaging portion 201 is separated from the positioning portion 19.

The latching portion 531 of the short connecting bar 53 of the fixing mechanism 100 is latched with the second engaging portion 204 of the peripheral component 200, to prevent detachment of the first engaging portion 201 from the positioning portion 19, thereby firmly fixing the peripheral component 200 in the holding portion 11 of the housing 10. Furthermore, the sliding member 40 of the fixing mechanism 100 biases the link bar assembly 50, such that the link bar assembly 50 biases the peripheral component 200 out, thereby the peripheral component 200 is conveniently detached from the holding portion 11 of the housing 100.

It is to be understood that the latching portion 531 of the short connecting bar 53 can also be another structure, such as a hook fixed in an end of the short connecting bar 53. The second engaging portion 204 of the peripheral component 200 can also be another structure, such as a hook or a protrusion defining a through hole. The positioning portion 19 of the housing 10 can also be a positioning protrusion arranged at a sidewall of the holding portion 11, correspondingly, wherein the second engaging portion 204 is a positioning groove defined on a sidewall of the peripheral component 200. The guiding portion 17 can also be a substantially L-shaped rib. The latching portion 531 of the short connecting bar 53 is disposed in the gap between the L-shaped rib and the through hole sidewall.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A fixing mechanism for a peripheral component of an electronic device, comprising:
   a housing defining a holding portion to receive the peripheral component, a plurality of positioning portions and a guiding portion located on a plurality of sidewalls of the holding portion;
   a contact member moveably disposed in the housing adjacent to the holding portion;
   a sliding member resisting the contact member;
   a first resilient member resisting between the contact member and the housing, respectively; and
   a link bar assembly rotatably connected to the housing, wherein the link bar assembly comprises a latching portion located on a free end of the link bar assembly, the peripheral component comprises a first engaging portion and a second engaging portion, the first engaging portion is received in the positioning portion, wherein the link bar assembly is slided towards the housing when the contact member biases the link bar assembly via the sliding member, and at the same time the latching portion slides along the guiding portion until the latching portion latches the second engaging portion.

2. The fixing mechanism of claim 1, wherein the first engaging portion is a protrusion located on a side of the peripheral component, and the positioning portion is a positioning groove defined in an inner surface of a sidewall of the holding portion.

3. The fixing mechanism of claim 1, wherein the guiding portion is a substantially oblong hole running through an outer surface of the sidewall of the holding portion.

4. The fixing mechanism of claim 1, wherein the latching portion is a latching protrusion extending perpendicular to a free end of the link bar assembly, and the second engaging portion is a substantially oblong groove defined in a side of the peripheral component.

5. The fixing mechanism of claim 1, wherein the housing defines a step portion on a top surface of the housing adjacent to the holding portion.

6. The fixing mechanism of claim 5, wherein the housing further defines a first receiving groove and a second receiving groove, the first receiving groove and the second receiving groove defined in the step portion, the first receiving groove communicates with the second receiving groove at an outer side of the holding portion; the contact member, the first resilient member, and the sliding member are received in the first receiving groove; and the link bar assembly is received in the second receiving groove.

7. The fixing mechanism of claim 6, wherein the link bar assembly comprises a long connecting bar and a short connecting bar, wherein two ends of the long connecting bar are rotatably connected to the housing and the short connecting bar, and the latching portion is located on a free end of the short connecting bar.

8. The fixing mechanism of claim 7, further comprising a second resilient member interconnecting the housing and the long connecting bar.

9. The fixing mechanism of claim 8, wherein the contact member comprises a biasing portion and a support protrusion, the support protrusion located on a side of the biasing portion, and the first resilient member sleeves on the support protrusion.

10. The fixing mechanism of claim 9, wherein the contact member comprises a resisting protrusion located on a side of the biasing portion adjacent to the support protrusion.

11. The fixing mechanism of claim 10, wherein the biasing portion defines an angled surface on a side of the biasing portion away from the resisting protrusion and a dovetail groove on the angled surface, and the sliding member comprises a sliding protrusion having a substantially dovetail shape slidably received in the dovetail groove.

12. An electronic device, comprising: a housing defining a holding portion on a top surface of the housing, a guiding portion and a plurality of positioning portions on opposite sidewalls of the holding portion, a peripheral component receiving in the holding portion;

a contact member moveably disposed in the housing adjacent to the holding portion; a sliding member resisting the contact member;

a first resilient member resisting between the contact member and the housing, respectively;

the peripheral component comprising a first engaging portion and a second engaging portion located on opposite sides of the peripheral component;

a link bar assembly rotatably connected to the housing, wherein the link bar assembly comprises a latching portion located on a free end of the link bar assembly, the first engaging portion is received in the positioning portion, and the latching portion latches the second engaging portion.

13. The electronic device of claim 12, wherein the first engaging portion is a protrusion located on a side of the peripheral component, and the positioning portion is a positioning groove defined in an inner surface of a sidewall of the holding portion.

14. The electronic device of claim 12, wherein the guiding portion is a substantially oblong hole running through an outer surface of the sidewall of the holding portion.

15. The electronic device of claim 12, wherein the latching portion is a latching protrusion extending perpendicular to a free end of the link bar assembly, and the second engaging portion is a substantially oblong groove defined in a side of the peripheral component.

16. The electronic device of claim 12, wherein the housing defines a step portion on a top surface of the housing.

17. The electronic device of claim 16, wherein the housing further defines a first receiving groove and a second receiving groove, the first receiving groove and the second receiving groove defined in the step portion, the first receiving groove communicates with the second receiving groove at an outer side of the holding portion; the contact member, the first resilient member, and the sliding member are received in the first receiving groove; the link bar assembly is received in the second receiving groove.

18. The electronic device of claim 17, wherein the link bar assembly comprises a long connecting bar and a short connecting bar, wherein two ends of the long connecting bar are rotatably connected to the housing and the short connecting bar, and the latching portion is located on a free end of the short connecting bar.

19. The electronic device of claim 18, further comprising a second resilient member interconnecting the housing and the long connecting bar.

20. The electronic device of claim 19, wherein the contact member comprises a biasing portion and a support protrusion, the support protrusion located on a side of the biasing portion, and the first resilient member sleeves on the support protrusion.

* * * * *